Nov. 7, 1950

H. C. PYE 2,529,418

TELEPHONE SUBSTATION APPARATUS FOR LOCAL AND COMMON BATTERY SERVICE

Filed June 25, 1947

INVENTOR.
HAROLD C. PYE

BY Chas. Tu. Candy

ATTORNEY

Patented Nov. 7, 1950 2,529,418

UNITED STATES PATENT OFFICE 2,529,418

TELEPHONE SUBSTATION APPARATUS FOR LOCAL AND COMMON BATTERY SERVICE

Harold C. Pye, Oak Park, Ill., assignor to Automatic Electric Laboratories, Inc., Chicago, Ill., a corporation of Delaware Application June 25, 1947, Serial No. 757,001

7 Claims. (Cl. 179—81)

Figure 1:
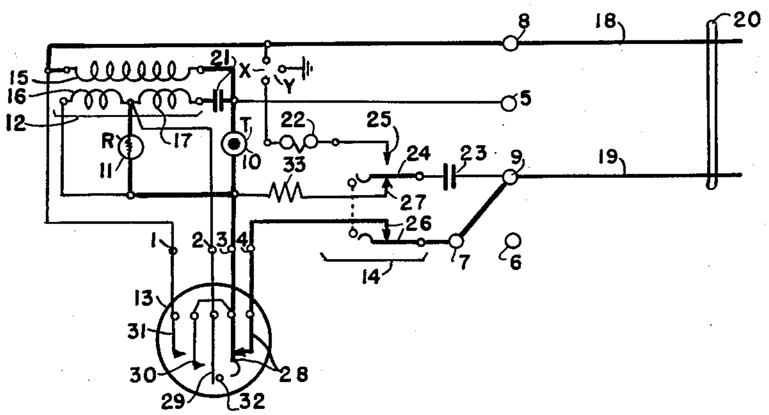

The present invention relates to telephone substation apparatus and has for one of its objects the provision of an improved and exceedingly simple substation circuit of the anti-side-tone booster type which is adapted for use in telephone systems of the central battery type, either automatic or manual and telephone systems of the local battery type.

It is a further object of the invention to provide in a substation circuit an improved arrangement for converting the substation unit from a local battery unit to a central battery unit by the changing of only one connection, thereby eliminating the need of extensive wiring changes and changing the induction coil as has been necessary in the past.

The present trend for managers of local battery magneto telephone exchanges to convert to common battery automatic operation, when possible, makes such a convertible substation unit desirable. This is because they hesitate to invest in modern telephone instruments when they might have a low salvage value at the time of such conversion. With the present invention the substation unit need only have a dial added, one interconnecting strap changed and the magneto and battery box unit discarded. The cost of this conversion, therefore, is small in comparison to that previously required of replacing the complete substation unit or changing the induction coil and usually making some extensive wiring changes. The conversion gives in every respect the same high quality service as if the substation units were originally purchased for central battery service.

Another object of the invention is to provide an improved substation circuit of the character described which is so arranged that grounded or metallic ringing may be utilized in signalling over the line extending to the circuit without modification of the circuit.

The invention is illustrated in one of its embodiments, as a central battery automatic type substation, which comprises a telephone transmitter, a telephone receiver, an induction coil, a hook or cradle switch, and a calling or impulsing device interconnected to form a substation circuit. For the purpose of signalling the substation attendant or subscriber on calls incoming to the substation, there is also provided a signal device arranged to be energized by ringing current projected by way of the line extending to the substation. More particularly, this signal device is provided with an operating circuit which includes at least one of the conductors of the line extending to the substation and a condenser. When arranged for metallic ringing, the signal device is normally bridged between the two conductors of the substation line in series with the condenser. On the other hand, when grounded ringing is to be used, the signal device is bridged between one of the line conductors and ground in a circuit which includes the condenser. It may readily be understood that the elements of the substation circuit, as enumerated above, are so connected and arranged that the signal device may be arranged for grounded or metallic ringing over the line extending to the substation without any change in the substation circuit.

The other embodiment of the invention is illustrated as a local battery magneto signalling substation which comprises a telephone transmitter, a telephone receiver, an induction coil, a signal device, and a hook or cradle switch. Also associated with and interconnected to the substation to form a substation circuit, is a hand operated generator for producing signalling currents and a battery and choke coil connected to supply energy for the substation telephone transmitter. The signal device, as previously described, is arranged for grounded or metallic ringing.

Further features of the invention pertain to the particular arrangement of the circuit elements whereby the foregoing and additional objects are attained.

The novel features believed to be characteristic of the invention are set forth with particularity in the appended claims. The invention, both as to its organization and method of operation, together with further objects and advantages thereof, will best be understood by reference to the specification taken in connection with the accompanying drawing, in which Figure 1 illustrates a substation circuit, having embodied therein the features of the invention when used as a central battery substation as briefly outlined above; and Figure 2 illustrates a modification of the circuit shown in Figure 1 when used as a local battery substation.

Figure 2:
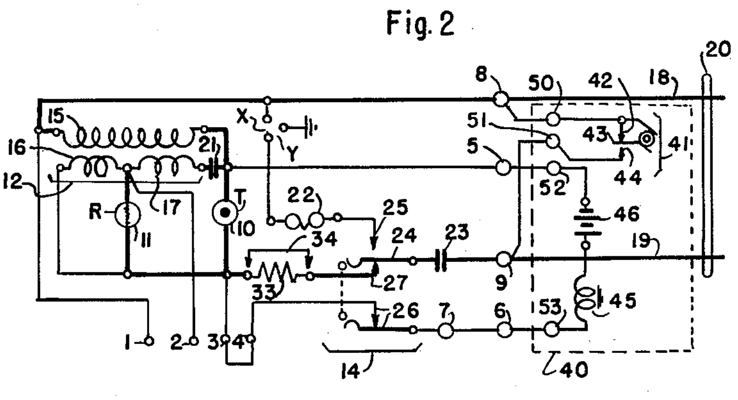

Referring now more particularly to Figure 1 of the drawing, the substation circuit there illustrated comprises a telephone transmitter 10, a receiver 11, an induction coil 12, a calling device 13 and a hookswitch 14, interconnected to form a substation circuit of the well-known anti-side-tone type. This circuit includes line terminals 8 and 9 terminating the conductors 18 and 19 of a line 20 extending to an exchange, not shown, of the automatic type. The induction coil 12 comprises three inductively coupled windings 15, 16 and 17, serially included in a branch circuit connected between the line conductors 18 and 19 of the line 20. This branch circuit also includes a coupling condenser 21 connected between the two windings 15 and 17, which condenser is effective to prevent the receiver from being energized by the direct current flowing over the line 20 when the substation is connected for use. The portion of the branch circuit including the two windings 16 and 17 and the condenser 21 is shunted by the transmitter 10, and the receiver 11 is connected between one side of the transmitter 10 and the junction point between the two windings 16 and 17 to shunt the winding 16 of the induction coil 12. Since the condenser 21 is connected between the two windings 17 and 15 it is protected against high voltages appearing upon the line 20 which voltage surges might result in puncturing the insulation of the condenser.

For the purpose of giving an audible indication of calls incoming to the substation, there is provided a signal device in the form of a ringer 22 which may be arranged for ground or metallic ringing, as desired. If metallic ringing is to be used, the "X" wiring shown in the drawing is used, whereas if the line 20 is arranged for grounded ringing, the "Y" wiring illustrated in the drawing is utilized. In either case the signal device 22 is normally connected to be energized over an operating circuit including the line conductor 19, a condenser 23 and normally closed contact springs 24 and 25 embodied in the hook switch 14. For the purpose of operatively connecting the substation circuit for communication over line 20, the hook switch 14 is also provided with a pair of springs 26 which normally occupy the open circuit position.

The calling device 13 is of the conventional dial operated type and comprises contact springs 28 which are utilized to transmit control impulses by way of the line 20 to the automatic switching equipment provided in the exchange terminating the line. The device 13 further comprises three shunt springs 29, 30 and 31 which are arranged to be moved into engagement during operation of the device by an actuating member indicated at 32. As indicated, the springs 29 and 30 are included in a path for short-circuiting the receiver 11 and the springs 30 and 31 are included in a path for short circuiting the entire substation circuit during operation of the calling device 13. It will be understood that where the common battery central office is not automatic, the calling device 13 may be omitted from Fig. 1, and terminals 3 and 4 connected together as in Fig. 2.

There is provided a normally incomplete, nonoscillatory energy absorbing circuit for substantially preventing electrical transients of oscillatory character from being developed during operation of the calling device 13 and, more particularly, during the initial portion of each period when the impulsing springs 28 are opened. This circuit comprises the condenser 23 and a resistor 33 which are arranged to be connected in series when the hook switch is operated to its off-normal position to close the contact springs 24 and 27. Following the completion of this circuit and closure of the springs 26, the circuit is connected in shunt with the impulsing springs 28. Also, with the impulsing springs 28 in engagement, the circuit shunts the hook switch springs 26. It is pointed out here that the contact springs 26 are so adjusted that when the hook switch 14 is operated to its normal position from the off-normal position shown in the drawing, the springs 26 are opened before the spring 24 is moved from engagement with spring 27 to interrupt the energy absorbing circuit comprising the resistor 33 and the condenser 23.

Normally, the springs 26 are open-circuited, the springs 24 and 27 are disengaged and the springs 24 and 25 are in engagement to maintain the operating circuit of the signal device 22 in a condition such that the signal device 22 will be energized when ringing current is projected over the line 20. With the enumerated springs of the hook switch 14 in the positions just described, if the line 20 is seized by one of the numerical switches provided in the exchange terminating the line and tests idle, ringing current is projected over the line to energize the signal device 22. If the line 20 and the signal device 22 are arranged for ground ringing, the path transversed by the ringing current may be partially traced as extending by way of the conductor 19, the condenser 23, the springs 24 and 25 and the winding of the device 22 to ground. On the other hand, if the line 20 and the signal device 22 are arranged for metallic ringing, the current-return path to the distant exchange is by way of line conductor 18. The call is answered in the usual manner by operating the hook switch 14 to its off-normal position, at which time the springs 24 and 25 are opened to interrupt the circuit for energizing the signal device 22; the springs 26 are closed operatively to connect the substation circuit to the line 20 and the springs 24 and 27 are moved into engagement to complete the above-described energy absorbing circuit. When the springs 26 are closed, a direct current bridging path is connected between the line conductors 18 and 19 of the line 20. This path may be traced as extending from the line conductor 19 by way of hook switch springs 26, the impulsing springs 28, the transmitter 10 and the induction coil winding 15 to the opposite line conductor 18. The completion of this path may be utilized in the usual manner to cause the operation of a back-bridge relay (not shown) embodied in the connector switch by way of which the connection is routed to the line 20. Since the transmitter 10 is included in this path, it will be understood that the transmitter is energized by the direct current flowing from the exchange battery through the windings of the back-bridge relay embodied in the operated connector switch and over the line 20. Following the operation of the hook switch 14 to its off-normal position in the manner just described, signal currents incoming to the substation traverse the above-traced bridging path between the line conductors 18 and 19. Since these currents flow through the winding 15 of the induction coil 12, corresponding induced voltages are developed in the winding 16 which cause corresponding signal currents to traverse the windings of the receiver 11. The signal currents flowing through the windings of the receiver 11 are reproduced as sound in the usual manner. Signal currents developed by operation of the transmitter 10 follow three closed circuits. One of these circuits may be traced as extending from the line terminal 8 by way of the winding 15, the transmitter 10, the impulsing springs 28, the hook switch springs 26 and the loop circuit comprising the conductors 19 and 18 back to the terminal 8. The second closed circuit comprises the condenser 21, the two induction coil windings 16 and 17 and the transmitter 10 while the third includes the winding 17 and the receiver 11. In this regard, it is pointed out that the winding 17 is so poled with respect to the winding 15 that the induced voltages developed in the winding 15, as a result of the currents flowing through the winding 17, aid the currents flowing directly through the winding 15 and, thus, the well-known booster effect is achieved. The signal currents traversing the winding 16 over the closed circuit just traced, are substantially equal and opposite to the currents induced in the winding 16 as a result of the signal currents flowing over the loop circuit extending to the line terminating exchange. Thus, the resultant voltage drop across the winding 16 for signal currents within the voice frequency range is substantially zero and the well-known anti-side-tone effect is realized.

The substation circuit as described above is balanced to achieve the maximum possible suppression of the side tone during operation of the transmitter 10 by properly proportioning the impedance of the induction coil winding 16 so that it effectively balances the impedance of the line 20 and the other apparatus associated therewith, measured at the line terminals 8 and 9, when a connection extending by way of the line is completed between the substation illustrated and a second substation. For perfect balance, it is necessary that the voltage across the winding 16 resulting from current flowing in the closed loop circuit comprising the condenser 21 and the two windings 17 and 16 be equal and opposite to the voltage induced in the winding 16 and resulting from the coupling between the windings 16 and 17, at all frequencies within the operating range. Since the voltages just mentioned are in part determined by the constants or effective impedances of lines having different characteristics, the impedance of the winding 16 is proportioned to equalize the voltage components for lines having average impedance characteristics whereby reasonably good side-tone suppression is achieved regardless of the character of the lines utilized in an established conversational connection.

In order to release the connection established in the manner just described after the conversation is ended, the receiver 11 is returned to its supporting hook to cause the hook switch 14 to operate to its normal position. During the return of this switch to normal, the springs 26 are first opened to interrupt the direct current circuit by way of which energizing current is conducted to the transmitter 10. When the springs 26 are first opened, a transient voltage tends to be developed which may be of oscillatory character and may have high frequency components within the radio frequency range. Such transient voltages are objectionable since they interfere with radio reception. Since, however, the circuit, comprising the condenser 23 and the resistor 33, is not interrupted at the time the springs 26 are opened, the transient energy developed by the opening of the springs 26 is dissipated in the resistor 33 and only a minute portion of the transient energy is radiated. It will be noted that the energy absorbing circuit is substantially free of inductance and hence, is non-oscillatory in character. Thus, the possibility of the absorbing circuit oscillating to cause a substantial amount of radio frequency energy to be radiated, is obviated. After the transient energy is dissipated in the manner just described, the springs 24 and 27 are moved out of engagement to interrupt the absorbing circuit and the springs 24 and 25 are moved into engagement to reprepare the operating circuit for the signal device 22.

In order to initiate a call at the substation illustrated in Figure 1, the receiver 11 is removed from its supporting hook in the usual manner to cause the operation of the hook switch 14 to its off-normal position. In response to the operation of the hook switch, the above-traced bridging path between the line conductors 18 and 19 of line 20 is completed, thereby to cause the connection to be extended to one of the numerical switches provided in the line terminating exchange in the usual manner. Also when the hook switch 14 is operated to its off-normal position, the above described energy absorbing circuit is completed through closure of the springs 24 and 27. Following the receipt of dial tone, the calling party may operate the impulsing device 13 to cause switch control impulses to be transmitted by way of the line 20 to the automatic switching equipment provided in the distant exchange.

When the dial of the impulsing device 13 is moved off-normal during the forward stroke thereof, the actuating element 32 is operated to close the springs 29, 30 and 31. When the springs 29 and 30 are closed, the receiver 11 is short-circuited over an obvious path, thereby to prevent electrical transients occasioned by operation of the impulsing springs 28 from being reproduced as clicks in the receiver. At springs 30 and 31, the entire substation circuit is short-circuited, thereby to lower the impedance of the circuit traversed by the current impulses resulting from the opening and closing of the impulsing springs 28. During each return movement of the dial, the springs 28 are opened and closed a number of times depending upon the digit dialed. When these springs are open, the loop circuit extending to the automatic switching equipment in the distant exchange is interrupted, thus arresting the flow of direct current over the conductors of the line 20. During the preliminary break period of the springs 28, occurring during each impulse, voltage and current transients, similar to those described above and occasioned by opening the hook switch springs 26, are developed. Since, however, the energy absorbing circuit comprising the resistor 33 and the condenser 23, is now connected in shunt with the springs 28, the transient energy is dissipated in the circuit without the production of high frequency oscillatory currents. Thus the circuit comprising the resistor 33 and the condenser 23 also functions to prevent high frequency radio interference energy from being developed during operation of the impulsing device. After the desired connection at the distant substation is completed and the conversation is terminated, the connection may be cleared out at the substation illustrated in Figure 1 in the manner explained previously.

Referring now to Figure 2 of the drawing, the circuit there illustrated shows a substation unit, having the same anti-side-tone and signalling features as described above, converted into a local battery substation unit and in all esesntial respects is similar to the circuit shown in Figure 1. Thus, like reference characters have been used to designate corresponding elements in the two circuits. The circuit of Figure 2 differs from that of Figure 1 in that a separate generator and battery box, represented by the rectangle 40, has been added and connected to the substation unit as shown, the dial 13 removed and the terminals 3 and 4 connected together, the connection between terminals 7 and 9 removed and a connection between terminals 7 and 6 added.

It will be noted that the means of audible indication of calls incoming to the substation, by means of the signal device 22, is the same as described previously for both metallic and grounded signalling and will not be further discussed herein.

When the called subscriber answers the incoming call, the hook switch 14 is operated to its off-normal position, and a voice bridging path is connected between the line conductors 18 and 19 of the line 20. This path may be traced as extending from the line conductor 18, the induction coil winding 15, the transmitter 10, resistor 33, hook switch springs 27 and 24, the condenser 23 to line conductor 19. Following the operation of the hook switch 14 to its off-normal position, just described, signal currents incoming to the substation traverse the above traced bridging path between the line conductors 18 and 19. Since these currents flow through the winding 15 of the induction coil 12, corresponding induced voltages are developed in the winding 16 which causes corresponding signal currents to traverse the windings of the receiver 11. The signal currents flowing through the windings of the receiver 11 are reproduced as sound in the usual manner and as previously described for operation of Figure 1.

The transmitter 10 is supplied talking battery through a local circuit which may be traced as follows; one side of transmitter 10, the substation terminal 5, terminal 52 of the generator and battery box 40, local battery 46, choke coil 45, terminal 53, substation terminals 6 and 7, hook switch springs 26, terminals 3 and 4, to the other side of the transmitter 10. Thus local battery is fed to the transmitter 10 under control of the hook switch springs 26, the battery 46 and choke 45 being effectively in shunt with the transmitter 10, their impedance to voice frequencies being high relative to the impedance of the transmitter, and the D. C. resistance of the choke 45 being low enough to permit a normal flow of current through the transmitter for good voice reproduction.

Signal currents developed by operation of the transmitter 10 effectively charge the condenser 21 in increasing and decreasing values, and signal currents are thereby produced, traversing the closed circuit comprising the condenser 21, induction coil windings 17 and 16 and the transmitter 10. It will be understood that the induced voltages developed in winding 15 as a result of the current flowing through the winding 17 will produce a signal current in winding 15 which will be transmitted over the closed loop of line 20 by way of the transmitter 10, resistor 33, hook switch springs 27 and 24, condenser 23, line conductor 19, over the loop circuit extending to the line terminating exchange, line conductor 18, and winding 15 of the induction coil. It will be readily seen that there is no direct current flowing through any winding of the induction coil, thus it may be said that the talking circuit is dry.

The signal currents traversing the winding 16 over the closed circuit just traced, are substantially equal and opposite to the currents induced in the winding 16 as a result of the signal currents flowing over the loop circuit extending to the line terminating exchange. Thus, the resultant voltage drop across the winding, for signal currents within the voice frequency range, is substantially zero and the well-known anti-sidetone effect is realized.

If the loop resistance of the line 20 is exceedingly high for normal transmission of voice signals the strap 34 may be placed around the resistor 33 thereby effectively reducing the line resistance. Under normal line conditions the shunting out of the resistor 33 is not required.

The release of the established connection, just described, is effected by replacing the receiver or handset, which in turn will restore the hook switch 14 to its normal position. Thus the local battery circuit is opened at springs 26, the line conductor 19 is disconnected from the transmitter and induction coil circuit at springs 27 and 24, and the signal device 22 again connected to the line conductor 19 by way of springs 24 and 25.

When a subscriber wishes to initiate a call from the substation he will first remove the receiver, which operates the hook switch 14 to its off-normal position, and listen in on the line. If there is not already a conversation in progress, he will replace the receiver, restoring the hook switch 14 to its normal position and operate the hand generator 41 in the well known manner to signal the operator at the line terminating exchange or produce a coded signal to signal another subscriber on the same line.

Upon operating the generator, the initial portion of the turning of the hand crank will cause the spring 43 to move away from the spring 42, removing the shunt around the generator, and will bring springs 43 and 44 into engagement thereby connecting the generator across the line 20 over which path the signal current produced by the generator 41 will be extended over the line by way of terminal 51, substation terminal 9, line conductor 19, line 20, through the signal device 22 and other similar signal devices in parallel on the line. It has been assumed in the foregoing description that metallic signalling was used.

Upon the completion of sending the coded signal by means of the hand generator 41, the calling subscriber will again remove his receiver, which action operates the hook switch 14 to its off-normal position and when the called party answers, conversation may be had as previously described.

While there has been described what is at present considered to be the preferred embodiment of the invention, it will be understood that various changes may be made therein, and it is contemplated in the appended claims, to cover all such changes as fall within the true spirit and scope of the invention.

What is claimed is:

1. A telephone substation circuit adapted to be connected to a two conductor telephone line for use in either central battery service or local battery service with magneto generator signalling, comprising, in combination, a transmitter, an induction coil including a plurality of coupled windings, a condenser, and a plurality of connecting terminals; said line connected to a first and second terminal of said plurality of terminals; one of said windings of said induction coil, said transmitter and said condenser connected in series between said first terminal and said second terminal; a third one of said terminals connected to the junction of said one induction coil winding and said transmitter; a fourth one of said terminals connected between said second terminal and the junction of said transmitter and said condenser; an energy supply and a choke coil connected in series, a magneto generator and said substation circuit convertible to local battery service through connection of said energy supply and choke coil across said transmitter to cause direct current from said source to flow through said transmitter and choke alone by disconnecting said fourth terminal from said second terminal and connecting said fourth terminal to a fifth one of said terminals, and then connecting said supply and choke to said third and fifth terminals and said generator to said first and second terminals.

2. A telephone substation circuit adapted to be connected to a telephone party line for either central battery feed or local battery feed and comprising, in combination, a pair of line terminals, an induction coil including a plurality of coupled windings, a branch circuit connected across said line terminals and the conductors of said line and having said windings serially included therein, a condenser included in said branch circuit and connected between two of said windings, a receiver connected across a third one of said windings between one of said line terminals and the junction point between a pair of said windings, a transmitter connected between said one line terminal and the junction point between said condenser and one of said first named two windings to shunt a portion of said branch circuit including said condenser, talking battery being supplied to said transmitter through said last named one of said windings and said line in series when said substation is used on a telephone line having central battery feed; a magneto generator, a local battery source connected in series with a choke coil, and circuit and terminal arrangements for connecting said generator across said line terminals and for shunting said source and choke across said transmitter independently of said line terminals, and convert to cause direct current from said source to flow only in said transmitter and choke and convert said substation for use on a telephone line requiring local battery feed and magneto generator signalling.

3. A magneto telephone substation of the local battery type adapted to be connected to a two conductor line and comprising, in combination, an induction coil including a plurality of coupled windings, a pair of line terminals, a branch circuit connected across said line terminals and having said windings serially included therein, a condenser included in said branch circuit and connected between two of said windings, a receiver connected across one of said windings between one line terminal of said branch circuit and the junction point between a pair of said windings, a transmitter connected between said one line terminal and the junction point between said condenser and one of said two windings to shunt a portion of said branch circuit including said condenser, a magneto generator connected directly across said line terminals for signalling purposes, a local battery source connected in series with a choke coil and shunted directly across said transmitter and circuit means for causing only alternating current to flow through said last named one of said windings while causing direct current from said source to flow only through said transmitter and said choke.

4. A telephone substation circuit, for use in either central battery or local battery party line service with magneto generator signalling, adapted to be connected to a two conductor line and comprising, in combination, a transmitter, a receiver, an induction coil and an impulsing device interconnected to form a substation circuit of the anti-side-tone type, a signal device, a condenser, said signal device connected in series with said condenser across the conductors of said line for metallic ringing, or in series with said condenser and between one of the conductors of said line and ground for grounded ringing, said impulsing device including contacts operative to transmit control impulses by way of said line in case said substation is being used for central battery automatic service, a non-oscillatory circuit including said condenser for substantially preventing electrical transients of oscillatory character from being developed during operation of said impulsing device, a power source and a choke coil in series, terminal means for converting said circuit for local battery service by connecting said source and choke across a portion of said terminal means and said transmitter after changing only a single interconnection in said circuit, and said condenser then effective to isolate said line from said power source and cause direct currents from said source to flow only through said transmitter and choke.

5. A local battery magneto telephone substation circuit adapted to be connected to a telephone party line utilizing hand generator signalling and comprising, in combination, a hookswitch, an induction coil including a plurality of coupled windings, a branch circuit connected across the conductors of said line and having said windings and said hookswitch serially included therein, a condenser included in said branch circuit and connected between two of said windings, a receiver connected across one of said windings between one line terminal of said branch circuit and the junction point between a pair of said windings, a transmitter connected to said hookswitch and in shunt with the portion of said branch circuit which comprises two of said windings and said condenser, a power source and a choke coil in series connected directly in shunt across said transmitter through said hookswitch, and a second condenser included in series with said hookswitch and one conductor of said line isolating said power source from said line to cause direct currents from said source to be confined to said transmitter and said choke and hookswitch.

6. A local battery magneto telephone substation circuit adapted to be connected to a telephone line utilizing hand generator signalling and comprising, in combination, a pair of line terminals, an induction coil including first, second and third coupled windings, a branch circuit connected across the conductors of said line via said terminals and having said windings serially included therein, a condenser included in said branch circuit and connected between the first and second of said windings, a receiver connected across one of said windings between one line terminal of said branch circuit and the junction point between the second and third of said windings, a transmitter connected between said one line terminal and the junction point between said condenser and the first of said windings to shunt a portion of said branch circuit including said condenser, a battery and choke coil in series directly shunting said transmitter independently of said line terminals and a second condenser included in said branch circuit isolating said battery from said line and from said first of said windings to cause direct currents from said battery to flow only in said transmitter and said choke coil.

7. A local battery telephone substation circuit including a pair of line terminals, a condenser, a transmitter, and an induction coil having a plurality of coupled windings, with said condenser and said transmitter and one of the windings of said induction coil connected in series between said line terminals in the order named, a third terminal connected to the junction between said transmitter and said one winding, a fourth terminal connected to the junction between said transmitter and said condenser, a power unit comprising a magneto hand generator connected to said line terminals and a direct current energy source connected to said third and fourth terminals, said condenser serving to confine the direct current from said source to said transmitter alone, and said circuit convertible for common battery service by merely disconnecting said power unit and strapping said fourth terminal to one of said line terminals.

HAROLD C. PYE.

REFERENCES CITED

The following references are of record in the file of this patent:

UNITED STATES PATENTS

| Number | Name | Date |
|---|---|---|
| 1,560,726 | Powell | Nov. 10, 1925 |
| 2,214,259 | Pye | Sept. 10, 1940 |
| 2,344,338 | Woodruff | Mar. 14, 1944 |
| 2,356,031 | Carroll | Aug. 15, 1944 |